US008010342B2

(12) United States Patent
Uchimoto et al.

(10) Patent No.: US 8,010,342 B2
(45) Date of Patent: Aug. 30, 2011

(54) WORD USAGE ANALYZER (75) Inventors: Kiyotaka Uchimoto, Tokyo (JP); Mika Shindo, Tokyo (JP); Hitoshi Isahara, Tokyo (JP)

(73) Assignee: National Institute of Information and Communications Technology Incorporated Administrative Agency (JP)

( * ) Notice: Subject to any disclaimer, the term of this patent is extended or adjusted under 35 U.S.C. 154(b) by 862 days.

(21) Appl. No.: 11/995,413

(22) PCT Filed: Jul. 10, 2006

(86) PCT No.: PCT/JP2006/313666
§ 371 (c)(1),
(2), (4) Date: Jan. 11, 2008

(87) PCT Pub. No.: WO2007/007702
PCT Pub. Date: Jan. 18, 2007

(65) Prior Publication Data
US 2009/0089046 A1    Apr. 2, 2009

(30) Foreign Application Priority Data
Jul. 12, 2005  (JP) ................................. 2005-203157

(51) Int. Cl.
*G06F 17/27* (2006.01)
(52) U.S. Cl. .................... 704/9; 704/1; 704/10
(58) Field of Classification Search .................. 704/1, 3, 704/9, 10
See application file for complete search history.

(56) References Cited

U.S. PATENT DOCUMENTS

| 5,649,221 | A | * | 7/1997 | Crawford et al. | 715/234 |
| 7,363,213 | B2 | * | 4/2008 | Polanyi et al. | 704/8 |
| 2005/0154690 | A1 | * | 7/2005 | Nitta et al. | 706/46 |
| 2005/0171760 | A1 | * | 8/2005 | Tinkler | 704/10 |
| 2007/0282598 | A1 | * | 12/2007 | Waelti et al. | 704/10 |

OTHER PUBLICATIONS

Notification of Transmittal of Translation of the International Preliminary Report on Patentability (IPRP) dated Jan. 16, 2008; 10 pages.

* cited by examiner

*Primary Examiner* — Richemond Dorvil
*Assistant Examiner* — Douglas Godbold
(74) *Attorney, Agent, or Firm* — Banner & Witcoff, Ltd.

(57) ABSTRACT

A device or computer readable medium for accurately and automatically obtaining general-purpose information regarding the usage difference between a plurality of synonyms and quasi-synonyms, such as the types of words with which the synonyms and quasi-synonyms are often used, is described. The usage information may be obtained by receiving the input of a plurality of words; extracting sentence data including an inputted word from a corpus; analyzing the sentence structure of the sentence data and extracting nouns that are in a grammatical relationship with the inputted word included in the sentence data; extracting the nodes representing the nouns and the nodes representing the semantic category of the noun from a thesaurus and forming a directional graph for each inputted word; comparing a plurality of directional graphs and extracting the difference nodes; and outputting the extracted difference nodes as information relating to the usage difference of the inputted words.

22 Claims, 9 Drawing Sheets

[Sentence example containing "keen"]
Modifier to modified relationship

For the keen fun runner, why not get your next full or half marathon sponsored.

Predicative relationship

Gentler salute President FW de Klerk's government is very keen to present a modern progressive image, to dispel any nagging doubts the rest of the world may harbour about what a deeply repulsive Ideology apartheid really is.

[Example of structural analysis of sentence containing "keen"]
|ncmod| example (|For:1_IF| |the:2_AT| |keen:3_JJ| |fun:4_NN1|
|runner:5_NN1| |,:6_,| |why:7_RRQ| |not+:8_XX|
|get:9_VV0| |your:10_APP$| |next:11_MD|
|full:12_JJ| |or:13_CC| |half:14_NN1|
|marathon:15_NN1| |sponsor+ed:16_VVN|)
1 ; (-24.964)
|ncmod| |keen:3_JJ| |runner:5_NN1|

|ncsubj| |xcomp| example (|Gentler:1_JJR| |salute:2_NN1| |President:3_NNS1|
|FW:4_NP1| |de:5_NP1| |Klerk:6_NP1| |'s+:7_$|
|government:8_NN1| |be+s:9_VBZ| |very:10_RG|
|keen:11_JJ| |to:12_TO| |present:13_VV0|
|a:14_AT1| |modern:15_JJ| |progressive:16_JJ|
|image:17_NN1| |,:18_,| |to:19_TO| |dispel:20_VV0|
|any:21_DD| |nagging:22_JJ| |doubt+s:23_NN2|
|the:24_AT| |rest:25_NN1| |of:26_IO| |the:27_AT|
|world:28_NN1| |may:29_VM| |harbour:30_VV0|
|about:31_II| |what:32_DDQ| |a:33_AT1|
|deeply:34_RR| |repulsive:35_JJ|
|ideology:36_NN1| |apartheid:37_VVD|
|really:38_RR| |be+s:39_VBZ|) 0 ; ()
|ncsubj|-|xcomp|
|government:8_NN1| (|be+s:9_VBZ|) |keen:11_JJ|

[Sentence example containing "eager"]
Modifier to modified relationship

Featuring many of their greatest hits, the film captures the Brummie Band at their best, before an audience of around 35,000 eager fans.

Predicative relationship

It's often thoutht that previous attempts have failed because there aren't enough well-trained classical actors in the USA to make such a repertory company feasible, but this is increasingly not the case: American drama students are eager to train in the UK, and the percentage of successful auditions held is relatively high.

[Example of structural analysis of sentence containing "keen"]
|ncmod| example (|Feature+ing:1_VVG| |many:2_DA2| |of:3_IO|
|their:4_APP$| |greatest:5_JJT| |hit+s:6_NN2| |,:7_,|
|the:8_AT| |film:9_NN1| |capture+s:10_VVZ| |the:1
1_AT| |Brummie:12_NP1| |Band:13_NP1| |at:14_II|
|their:15_APP$| |best:16_JJT| |,:17_,| |before:18_RR|
|an:19_AT1| |audience:20_NN1| |of:21_IO|
|around:22_RG| |35,000:23_MC| |eager:24_JJ|
|fan+s:25_NN2|) 1 ; (-31.955)
|ncmod| |eager:24_JJ| |fan+s:25_NN2|
|ncmod| |greatest:5_JJT| |hit+s:6_NN2|

|ncsubj| |xcomp| example (|It:1_PPH1| |be+s:2_VBZ| |often:3_RR|
|think+ed:4_VVD| |that:5_CST| |previous:6_JJ|
|attempt+s:7_NN2| |have:8_VH0| |fail+ed:9_VVN|
|because:10_CS| |there:11_EX| |be+:12_VBR| |not+:13_XX|
|enough:14_RR| |well-trained:15_JJ| |classical:16_JJ|
|actor+s:17_NN2| |in:18_II| |the:19_AT| |USA:20_NP1|
|to:21_TO| |make:22_VV0| |such:23_DA| |a:24_AT1|
|repertory:25_NN1| |company:26_NN1| |feasible:27_JJ|
|,:28_,| |but:29_CCB| |this:30_DD1| |be+s:31_VBZ|
|increasingly:32_RR| |not+:33_XX| |the:34_AT|
|case:35_NN1| |:36_:| |American:37_JJ| |drama:38_NN1|
|student+s:39_NN2| |be+:40_VBR| |eager:41_JJ| |to:42_TO|
|train:43_VV0| |in:44_II| |the:45_AT| |UK:46_NP1| |,:47_,|
|and:48_CC| |the:49_AT| |percentage:50_NN1| |of:51_IO|
|successful:52_JJ| |audition+s:53_NN2| |hold+ed:54_VVN|
|be+s:55_VBZ| |relatively:56_RR| |high:57_JJ|) 1 ; (-67.687)
|ncsubj|-|xcomp|
|there:11_EX| (|make:22_VV0|) |feasible:27_JJ|
|ncsubj|-|xcomp|
|percentage:50_NN1| (|be+s:55_VBZ|) |high:57_JJ|
|ncsubj|-|xcomp|

<Example of weighted
directional graph for "keen">

ROOT (1370, 100.00%)
  entity (696, 50.83%)
    object, physical object (325, 23.73%)
      living thing, animate thing (280, 20.46%)
        organism, being (279, 20.38%)
          person, individual, someone,somebody, mortal, human, soul (266,19.47%)
            contestant(28, 2.05%)
            expert (23, 1.70%)
              horticulturist, plantsman (16 ,1.20%)
                gardener, nurseryman (16, 1.20%)
            worker (22, 1.65%)
              skilled worker, trained worker (18, 1.37%)
            leader (20, 1.53%)
            advocate, advocator, proponent, exponent (18, 1.38%)
              supporter, protagonist, champion, admirer, booster, friend (17, 1.29%)
      whole, whole thing, unit (19, 1.39%)
      artifact artefact (19, 1.39%)
    casual agent, cause, casual agency (269, 19.66%)
      contestant (27, 2.04%)
      expert (23, 1.70%)
        horticulturist, plantsman (16 ,1.20%)
        gardener, nurseryman (16, 1.20%)
          @gardener (16, 1.20%)
      worker (22, 1.65%)
        skilled worker, trained worker (18, 1.37%)
      leader (20, 1.53%)
        advocate, advocator, proponent, exponent (18, 1.38%)
          supporter, protagonist, champion, admirer, booster, friend (17, 1.29%)
    thing (66, 4.83%)
      part, piece (65, 4.80%)
        body part (65, 4.77%)
          organ (53, 3.94%)
            sense organ, sensory receptor, receptor (53, 3.90%)
              eye, oculus, optic (50, 3.66%)
                @eye (50,3.66%)
    location (28, 2.08%)
      region (18, 1.35%)
  group, grouping (207, 15.17%)
    social group (145, 10.65%)
      organization, organisation (125, 9.18%)
        polity (37, 2.74%)
          @government (35, 2.59%)
        unit, social unit (31, 2.28%)
          administrative unit, administrative body (16, 1.21%)
          institution, establishment (26, 1.91%)
            company (14, 1.05%)
              @company (14, 1.05%)
      people (34, 2.55%)
        @people (28, 2.05%)
  abstraction (157, 11.49%)
    attribute (70, 5.15%)
      quality (57, 4.18%)
        power, powerfulness (28, 2.07%)
          interest, interestingness (21, 1.56%)
            @interest (21, 1.56%)
        good, goodness (21, 1.56%)
          @interest (21, 1.56%)
    relation (65, 4.78%)
      social relation (39, 2.86%)
        communication (38, 2.81%)
          message, content, subject matter, substance (18, 1.34%)
      business relation (17, 1.29%)
        @company (17, 1.29%)
    measure, quantity, amount (20, 1.48%)
  psychological feature (132, 9.65%)
    cognition, knowledge, noesis (115, 8.40%)
      process, cognitive process, mental process, operation, cognitive operation (47, 3.46%)
        higher cognitive process (34, 2.48%)
          knowing (33, 2.44%)
            awareness, consciousness, cognizance, congnisance, knowingness (28, 2.05%)
              sense (18, 1.32%)
                @sense (18, 1.32%)
      content, cognitive content, mental object (15, 1.11%)
    feeling (16, 1.21%)
    state (53, 3.94%)
      cognitive state, state of mind (46, 3.40%)
        curiosity, wonder (41, 3.02%)
          @interest (40, 2.92%)
  act, human act, human activity (49, 3.59%)

<Example of weighted
directional graph for "eager">

ROOT (540, 100.00%)
  entity (301, 54.81%)
    object, physical object (142, 25.94%)
      living thing, animate thing (119, 21.70%)
        organism, being (119, 21.70%)
          person, individual, someone,somebody, mortal, human, soul (105,19.16%)
            worker (11, 2.13%)
              skilled worker, trained worker (9, 1.85%)
                serviceman, military man, man, military personnel (6, 1.18%)
            leader (8, 1.58%)
            user (6, 1.25%)
              customer, client (5, 1.06%)
            enrollee (5, 1.09%)
            relative, relation (5, 1.01%)
          animal, animate being, beast, brute, creature, fauna (13, 2.37%)
            chordate (11, 2.07%)
            mammal (8, 1.52%)
      whole, whole thing, unit (9, 1.80%)
      artifact, artefact (9, 1.65%)
    casual agent, cause, casual agency (106, 19.38%)
      worker (11, 2.13%)
        skilled worker, trained worker (9, 1.65%)
          serviceman, military man, man, military personnel (6, 1.18%)
      leader (8, 1.58%)
      user (6, 1.25%)
        customer, client (5, 1.06%)
      enrollee (5, 1.09%)
    thing (41, 7.46%)
      part, piece (40, 7.44%)
        body part (40, 7.43%)
          external body part (28, 5.25%)
            face, human face (12, 2.36%)
              @face (12,2.36%)
            extremity (10, 1.85%)
              hand, manus, mitt, paw (10, 1.85%)
                @hand (10, 1.84%)
          organ (6, 1.25%)
            sense organ, sensory receptor, receptor (5, 1.03%)
              @eye (5, 1.03%)
  group, grouping (93, 16.96%)
    social group (65, 11.98%)
      organization, organisation (42, 7.82%)
        unit, social unit (13, 2.38%)
          institution, establishment (8, 1.50%)
            company (5, 1.01%)
              @company (5, 1.01%)
        polity (6, 1.16%)
          @government (5, 1.01%)
        enterprise (5, 1.01%)
      gathering, assemblage (19, 3.52%)
        audience (6, 1.26%)
          @audience (6, 1.26%)
    people (19, 3.47%)
      @people (9, 1.75%)
  abstraction (61, 11.12%)
    relation (26, 4.74%)
      social relation (23, 4,20%)
        message, content, subject matter, substance (13, 2.54%)
      visual communication (6, 1.12%)
    attribute (20, 3.67%)
      quality (8, 1.52%)
      property (6, 1.12%)
    measure, quantity, amount (13, 2.54%)
  psychological feature (39, 7.14%)
    cognition, knowledge, noesis (26, 4.83%)
      content, cognitive content, mental object (15, 2.87%)
        belief (7, 1.29%)
        idea, thought (6, 1.19%)
    feeling (12, 2.29%)
  act, human act, human activity (24, 4.49%)
    activity (11, 22.13%)
    action (7, 1.32%)
  event (12, 2.20%)
    happening, occurrence, natural event (6, 1.21%)
  state (11, 2.12%)

[Output example of difference nodes and common nodes for "keen" and "eager"]

| Common nodes and nouns included in each node | |
|---|---|
| PEOPLE(keen: 2.6%, eager 3.5%)) | people(keen: 28, eager: 9) |
| INSTITUTION(keen: 1.9%, eager 1.5%) | company(keen: 14, eager: 5) |

| | Different nodes and nouns included in each node | |
|---|---|---|
| K E E N | CONTESTANT (4.1%) | sportsman(21), player(17), golfer(13), rival(4) etc. |
| | EXPERT (3.4%) | gardener(33), observer (6) etc. |
| | ADVOCATE (2.8%) | supporter(27), fan(8), enthusiast(3), admirer(2) etc. |
| | PEER, COMPEER (1.8%) | member(16), colleague(2), participant(2) etc. |
| | REGION (1.4%) | country(5), germany(2), russia(2) etc. |
| | GATHERING (3.5%) | audience(8), crowd(2) etc. |
| E A G E R | USER (2.5%) | buyer(6), customer(5), consumer(2) etc. |
| | ANIMAL, BEAST (2.4%) | dog(4), horse(2), elephant(1) etc. |
| | SERVICEMAN (2.4%) | volunteer(4), man(3) etc. |
| | ENROLEE (2.4%) | student(10), pupil(3), undergraduate(1) etc. |

WORD USAGE ANALYZER

CROSS REFERENCE TO RELATED APPLICATIONS

This application is a National Stage application of co-pending PCT application PCT/JP2006/313666 filed Jul. 10, 2006, which claims the benefit of Japanese application number 2005 203157 filed Jul. 12, 2005. These applications are incorporated herein by reference in their entireties.

TECHNICAL FIELD

The present invention relates to a program and a device for automatically analyzing the differences in usage between a plurality of synonyms and quasi-synonyms.

BACKGROUND ART

The correct differentiation and use of synonyms and quasi-synonyms in both oral and written communication is not only something that is found to be difficult by students studying a language as a foreign language, but is unexpectedly so even for native speakers using the language in their daily lives. Word processing software, foreign language instructional software, translation software and the like have come to be widely used in recent years. Software programs such as these have various support functions for performing input, editing, and output; however, none have implemented functionality for automatically providing the user with recommendations and differentiations based on differences in usage examples of a target word so as to enable the user to use the target word accurately.

One attempt at determining which types of words a target word can be easily used with is research in the field of linguistics studying the frequency of co-occurrence of words (Non-patent reference No. 1). In the aforementioned research, the structure of an inputted sentence is analyzed, the words appearing in the sentence that are found to share a structural relationship are subjected to a process for eliminating any randomness in the emerging association and for measuring a co-occurrence score; the scores are sorted, and words having a high score are deemed to share a deep structural relationship. In this case, if the synonyms having a high score among a plurality of synonyms that are target words are extracted, it becomes possible to estimate which types of usage examples there are for each respective synonym.

Non-patent Reference No. 1: Stefan Th. Gries and Anatol Stefanowitsch, "Extending collostructional analysis: A corpus-based perspective on alternations", International Journal of Corpus Linguistics, 9:1, 2004

SUMMARY OF THE INVENTION

However, in the method of the above-described Non-patent Reference No. 1, because the estimation as to whether or not a relation exists between words is based solely on the information relating to whether or not actual specific words co-occur in a single sentence, it is not clear whether or not the usage method of the target word will still be correct if the co-occurring word is different. In other words, according to method of the above-described Non-patent Reference No. 1, it is not possible to determine whether the usage method of the target word in the sentence will continue to be correct even if is the target word replaced with a synonym, or which type of word should be used to replace the target word so that the usage method will continue to be correct. Therefore, there is a demand for obtaining highly accurate information such as that relating to which synonym among a plurality of synonyms is the correct word to use, for any given sentence.

The present invention has been devised to solve problems such as those described above, and it is an object of the present invention to automatically obtain with a high degree of accuracy information of a highly general-purpose usefulness relating to the difference in usage method of synonyms and quasi-synonyms based on determining the types of words (i.e. words with which type of meaning, falling classified into which semantic category) with which the synonyms of a given target word are frequently used.

That is to say, the word usage difference information acquisition program according to the present invention is a program for causing a computer provided with a corpus, which is a usage example database containing example sentences for a plurality of target vocabulary words having the same or similar meaning, and a thesaurus, which is a database describing word-to-word relationships between one word and another within a conceptual hierarchy, to extract information relating to the difference in usage for each target word. The program according to the present invention is characterized in that it is provided with: a target word inputting step for causing a computer to receive an input of a plurality of target vocabulary words; a sentence extracting step for accessing the corpus to extract sentence data containing the target words for which input was received in the target word inputting step; a noun extracting step for analyzing the structure of each sentence data extracted in the sentence extracting step, and extracting nouns from the sentence data which are found to have a grammatical relationship with target words contained in each sentence; a directional graph forming step for accessing the thesaurus and searching out the nouns extracted in the noun extracting step, extracting the nodes representing the nouns and the nodes representing the higher ranking conceptual category within the conceptual hierarchy, and forming a directional graph constructed from each of the thus extracted nodes and the links that connect respective higher and lower ranking nodes and show the relationship therebetween with respect to the conceptual hierarchy, for each target word; a difference extracting step for comparing each of the directional graphs formed in the directional graph forming step, and extracting nodes that differ between the directional graphs of different target words; and a difference outputting step for outputting the differences of the directional graphs extracted in the difference extracting step as data relating to the difference in usage of the target words.

Here, as long as the number of words inputted in the inputting step is two or more, there are no particular limitations; however, the presumption of the present invention is that the inputted words are synonyms or quasi-synonyms having the same or similar meaning. The functions of any generally known sentence structure analysis software or morphological elements analysis software may be used for the sentence structure analysis processing in the noun extracting step. Further, regarding the nouns extracted in the same step, "have a grammatical relationship with the target words" means that the nouns and target word must be in a relationship of modifier to modified, predicative (e.g. subject complement, object complement and so on), and that these relationships can be identified from the information obtained through the sentence structural analysis process described above. Still further, as long as the "nodes that differ between the directional graphs of different target words" extracted in the difference extracting step are one or more nodes there are no particular limitations; moreover, there may be cases in which only the highest ranking node in the conceptual hierarchy from among the nodes determined to differ from the comparison of the directional graphs is included, and also cases in which nodes lower in rank than the highest ranking node may be included. This type of program may of course be used as a standalone program, however, it may also be used by being incorporated into a portion of another program, such as a sentence inputting program or translation program, or a language learning program. Note that regarding the plurality of inputted target words, even if the same word is inputted, operation is permitted. That is to say, the plurality of synonyms or quasi-synonyms to be inputted may include multiple instances of the same word. For example, if the same target word is inputted more than once, it is also possible to obtain usage differences by comparing the multiple instances of the same inputted target word with nouns that are in a modifier to modified relationship, or a subject to predicate relationship; when more than one instance of grammatical relations are found between a target word and a noun having a given type of meaning, it is possible to compare the types of grammatical relationship in which the noun and target word co-occur so as to determine in which types of grammatical relationships it is easier to use the noun with the target word. Here, when, for example, the target word is an adjective and the noun with which there is a meaningful relationship is a person, it will often be the case that the predicative usage will be employed, which means that it is useful in that this type of information can be obtained.

By using a program according to the present invention such as that described above, information relating to the usage differences of and synonyms and quasi-synonyms and of which acquisition has not been capable until now may be obtained as the difference between the nodes appearing on the directional graph for each target word, making it useful in applications such as studying proper usage of vocabulary words, automatic correction of inputted sentences, and the like. In particular, although generally known corpus or thesaurus database products may be used, the larger the scale of the database and the less specialized with respect to the field of the data stored therein, the more reliable the output information relating to usage differences of the target words. Note that the output of information in the difference extracting step may take the form of any of a variety of modes, such as the displaying of information on a monitor or other display device, the printing out of information, the sending of information to another computer, and so on.

The program according to the present invention such as that described above can be a program capable of causing a computer, in the difference extracting step, for example, to execute processing in which the same nodes or portions having links to the aforementioned same nodes within each directional graphs are demarcated as shared, and the difference nodes are extracted by superimposing each of the directional graphs. In this way, it is possible to easily obtain the nodes of differing portions of the directional graphs created for each target word. It also becomes possible to obtain the nodes of common portions at the same time.

In particular, if the number of target words received in the target word inputting step is three or more, in the difference extracting step it becomes easy to compare three or more directional graphs by having the computer repeatedly execute processing in which a common directional graph is formed from a plurality of the directional graphs that were formed in the directional graph forming step for target words aside from a specific target word, and the common directional graph is compared with the directional graph of the specific target word to extract the different nodes between the aforementioned directional graphs, whereby by repeating this processing using the directional graph of each target word as the directional graph of the specific target word, it becomes easy to compare three or more directional graphs.

Further, in any embodiment of the present invention, it is desirable that the computer executes processing in which: in the noun extracting step, data relating to the frequency with each of the nouns extracted from the sentence data occurs in a grammatical relationship with the target word is extracted together with each of the nouns; in the directional graph forming step, the node of each directional graph that is formed is weighted with the data relating to the frequency; in the difference extracting step, the directional graphs formed in the directional graph forming step with the weighting processing are used in the process for comparing each directional graph to extract the difference nodes between the directional graphs of different target words. If weighted directional graphs such as these are used, it becomes possible to prioritize the information obtained so as to more easily extract only information items that are required.

Particularly in this case, it is appropriate that the ratio of the frequency rate of occupied by each noun with respect to the total overall frequency rate for all of the nouns extracted for a given target word be applied as the data relating to frequency. In this case, it is preferable that the computer executes processing in which: in the directional graph forming step, the directional graphs are weighted based on said frequency ratio by appending the frequency to the nodes corresponding to the nouns in the directional graphs that are to be formed, appending the total value of the combined frequencies of said nodes representing the nouns to the node representing the higher conceptual category thereof, and appending to all nodes a frequency ratio that is a normalization of each of the individual frequencies; and in the difference extracting step, a ratio of the frequency rates of the same nodes in each of two of the directional graphs subjected to the weighing process and formed in the directional graph forming step is calculated for each of the aforementioned same nodes, and if the value of the calculated ratio is greater than or equal to a predetermined value, the nodes are incorporated into the difference nodes, which are the distinctive nodes, and those difference node are extracted. In this way, it becomes possible to make the weighting process highly reliable by using the frequency rate.

Further, it is also possible to have the computer execute processing in which: in the difference extracting step, a procedure in which the ratio of the frequency rate between each of the same nodes occurring in two directional graphs that are subjects of comparison is calculated and if the value of the calculated ratio is greater than or equal to a predetermined value, that same node is provisionally incorporated into the difference portion of the directional graph as difference a node, a predetermined number of the highest ranking nodes within the difference portion are extracted with respect to each target word in the order starting with the node having the greatest frequency-rate ratio, and the proportion of common nodes among the extracted node is calculated, is repeated while the frequency-rate ratio is gradually diminished; whereby; if the ratio of the common nodes calculated in each iteration of the processing is greater than or equal to a fixed value, that proportion of common nodes is compared to the proportion of common nodes calculated in the previous iteration of the procedure, and if the compared value is greater than or equal to a fixed value, nodes that were provisionally determined in that iteration of the procedure to be difference nodes are determined finally to be difference nodes and are extracted as a difference nodes. In this way, it becomes possible to appropriately identify nodes for which the difference in usage between synonyms is great by identifying nodes between which there is a drastic change in difference from among the vast amount of information obtained relating to differences, and to find the more appropriate difference points. Note that the processing for gradually reducing the frequency rate may be performed for each predetermined numerical value until the frequency rate is 0, or by adjusting the rate of reduction by having the words inputted using a suitable mechanical learning process. Further, the processing for comparing the proportion of common nodes obtained in an iteration of the procedure to the proportion of common nodes obtained in the preceding iteration of the procedure may be carried out by taking the difference or absolute value for both, or by taking the ratio of the common node proportions obtained in both iterations.

Note that in the processing occurring subsequent to the weighting process, instead of the frequency rate, the frequency number itself may be used as the frequency related data.

Further, in the processing related to the frequency (including processing in which the frequency rate is applied), it is also permissible if the computer is caused to execute processing in which: in the difference extracting step, the extracted difference nodes are subjected to a further extraction process in which a predetermined number of the extracted nodes is again extracted in the order starting from the nodes having a large weighted value based on frequency (may be performed for all of the difference nodes or only the difference node having the highest rank in the conceptual hierarchy), and the extracted predetermined number of nodes is outputted as the information relating to the difference in usage. Here, when the predetermined number of nodes is to be extracted in the order starting from those having a large weighted value based on frequency, all of the difference nodes may be extracted, or the extraction may be limited only to the difference node having the highest rank among the difference nodes, without adverse effect.

In each embodiment of the present invention described above, if processing is executed in the difference extracting step in which the highest ranking node in the conceptual hierarchy from among the extracted difference nodes is outputted as the information relating to difference in usage, the highest level conceptual difference in usage can be identified, and the user can to obtain useful information that is easy to understand Further, in the same manner, if it is possible to perform processing in the difference extracting step in which in the lowest ranking node in the conceptual hierarchy among the common nodes is outputted as the information relating to the difference in usage in addition to, or instead of, the highest ranking node among the difference nodes, it becomes possible to obtain the boundary between the difference portion and the common portion of the usage of respective target words. Note that according to the above-described invention, it is permissible that a predetermined number of the lowest ranking nodes among the common nodes are outputted, as described above by use of frequency weighting, or that all of the low ranking common nodes are outputted.

According to the above-described invention, particularly in the target word inputting step, if the parts of speech of the target words for which input can be received is limited to adjectives and verbs, for which it is difficult to correctly differentiate and use synonyms and quasi-synonyms, the invention is particularly useful.

Further, the word usage difference information acquisition device according to the present invention is a word usage difference information acquisition device configured by a computer for implementing the operations according to a program such as that described above, and extracts and outputs information relating to the usage differences of a plurality of inputted target words having the same or similar meaning. The computer is searchably provided with, or connectable to, a corpus, which is a usage example sentence database, and thesaurus, which is a database describing word-to-word relationships between one word and another within a conceptual hierarchy. The word usage difference information acquisition device according to the present invention is characterized in that it is provided with: a target word inputting means for causing a computer to receive an input of a plurality of target vocabulary words; a sentence extracting means for accessing the corpus to extract sentence data containing the target words for which input was received in the target word inputting step; a noun extracting means for analyzing the structure of each sentence data extracted in the sentence extracting step, and extracting nouns which are found to have a grammatical relationship with the target words contained in each sentence data; a directional graph forming means for accessing the thesaurus and searching out the nouns extracted in the noun extracting step, extracting the nodes representing the nouns and the nodes representing the higher ranking conceptual category in the conceptual hierarchy with respect to each noun, and forming a directional graph for each corresponding target word, the directional graph being constructed from each of the nodes and links that connect respective higher and lower ranking nodes and show the relationship therebetween with respect to a conceptual hierarchy; a difference extracting means for comparing each of the directional graphs formed in the directional graph forming step, and extracting nodes that differ between the directional graphs of different target words; and a difference outputting means for outputting the differences of the directional graphs extracted in the difference extracting step as data relating to the difference in usage for the target words.

This type of device, in general, adopts a configuration in which a program such as that described above is stored on a memory device such as a hard disk drive or the like with which a computer is provided, the program is read out into memory as needed, and processing is performed by a CPU (Central Processing Unit) to operate each type of input and output device; however, a configuration in which the program is stored on a network sever and a terminal computer accesses the network server and is operated by the program is also possible.

Hereinafter, though not to be described in detail, the word usage difference information acquisition device operated by the program according to each of the above described embodiments is basically capable of obtaining the same operational effects as the corresponding program.

According to the present invention, not simply information relating to which types of co-occurring words synonyms and quasi-synonyms may be used with in sentences is obtained, but information relating to which types of sentences (i.e. sentences representing a type of meaning) in which it is appropriate to use each of the words included in a plurality of synonyms and quasi-synonyms, which is information relating to the difference in usage between the synonyms, and is obtained automatically and with a high degree of accuracy. Accordingly, the information that is obtained is not information specialized for each word, but general-purpose information on the sentences in which the target words are used, which can be said to have a wide range of application. Further, when the present invention is used as a standalone device or program, because information relating to the usage difference of synonyms and quasi-synonyms can be obtained, it can be employed in language study or vocabulary checking, or, when used, for example, in foreign language learning software, sentence inputting software, translation software, or incorporated into a device including any of the aforementioned software programs, it is not limited to being used simply for extracting grammatical mistakes in the specified range, but can be utilized for a wide range of editing and support applications based on input from the usage examples.

BRIEF DESCRIPTION OF THE DRAWINGS

FIG. 6 shows an example of a weighted directional graph formed by the processing S4 of FIG. 2.

DETAILED DESCRIPTION OF THE EMBODIMENTS

Hereinafter, with reference to the drawings, a preferred embodiment of the present invention will be explained in detail. The current embodiment of the present invention describes the operation of a word usage difference information acquisition device (hereinafter sometimes referred to simply as "the Device A of the current embodiment") according to a word usage difference information acquisition program (hereinafter sometimes referred to simply as "the program of the current embodiment"). The computer realizing the Device A, as an example, can be an ordinary, general-purpose personal computer. Therefore, the computer used in the current embodiment is a general-purpose personal computer.

The hardware configuration of a personal computer such as that described above is of a commonplace variety and a detailed description thereof has therefore been omitted, however, such a configuration generally comprises components including a CPU or the like processing unit, a main memory (RAM), a hard disk drive (HDD) or other supplemental memory device, connected by a communication line (such as a bus or the like), said components being controlled by a system controller, an I/O controller or the like and operated in linkage. Further, the personal computer is provided with an input device such as a keyboard, or a mouse or other pointing device, an output device in the form of, for example, a display for displaying information as still or moving images and a display controlling device such as a display chipset or the like, an peripheral data receiving and transmitting communication device, and so on. Still further, normally, in addition to the program of the current embodiment, an operating system software (OS) will be installed on the HDD or the like, and when the personal computer is caused to execute the functionality of the device A, the program is read out from the RAM as required so as to cause the CPU to operate each respective hardware device based on the program of the current embodiment. The data that is formed in the course of processing or inputted or obtained from an external source is temporarily accumulated in the RAM or the like and then used in the processing described below.

In particular, according to the current embodiment of the present invention, the personal computer is connected via a communications device (see FIG. 1) to a corpus DB1 which is an example sentence database, and a thesaurus database DB2 which is a database describing word-to-word relationships of rank in a conceptual hierarchy, whereby it is possible for the computer to access the aforementioned DBs as required to search and read out information. Here the current embodiment utilizes the well known large scale corpus database BNC; (The British National Corpus; URL:htp://www.natcorp.ox.ac.uk/) via the Internet as the corpus DB1, and the well known large scale thesaurus WorldNet 2.0, which is a database that has a network configuration storing meaning-based hierarchical relationships between words, which is an example of a thesaurus DB2; however, it goes without saying that the current embodiment of the present invention is not limited to using the above-described databases as the corpus DB1 and the thesaurus DB2.

Figure 1:
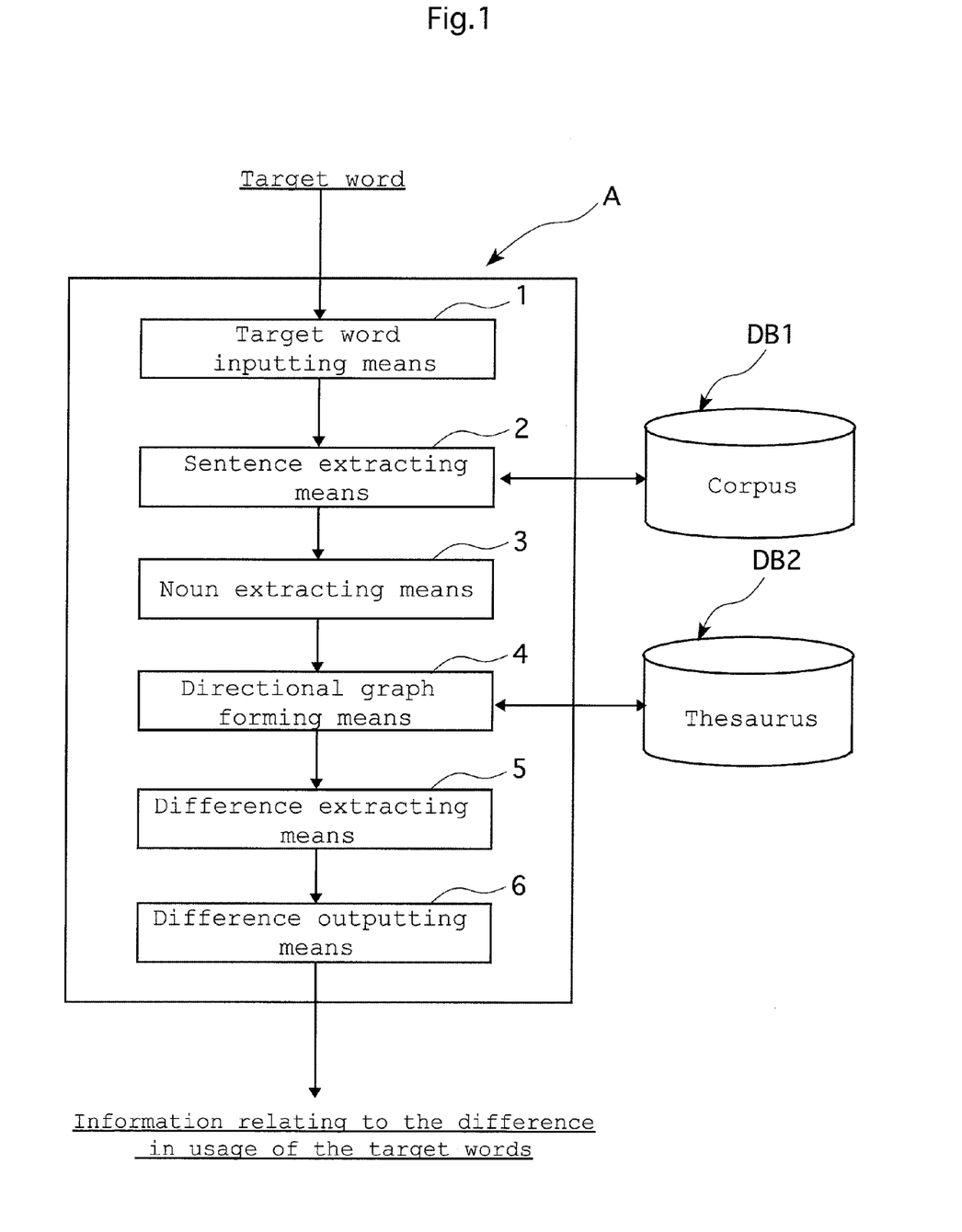
FIG. 1 is an overview of the functional configuration of the word usage difference information acquisition device according to a first embodiment of the present invention.

Next, operated under the control of the program of the current embodiment, the Device A of the current embodiment comprises, as shown in the functional configuration diagram of FIG. 1, the functions of a target word inputting means 1, a sentence inputting means 2, a noun extracting means 3, a directional graph forming means 4, a difference extracting means 5, and a difference outputting means 6. Hereinafter, the functions of each of the means comprising the Device A of the current embodiment and the order of processing thereof will be described in conjunction with a concrete example used for the purpose of convenience in illustration. In particular, in order to facilitate ease of understanding of the explanation, the two English words "keen" and "eager" have been used as the concrete examples of target words. Both terms are described as having almost the same meaning in the dictionary, ("keen: very interested, eager or wanting (to do) something very much", "eager: wanting much to do or have esp. something interesting or enjoyable", CIDE (The Cambridge International Dictionary of English); both words are adjectives having the meaning "to desire strongly", and it is remarkably difficult, especially for non-native speakers of English, to differentiate the usage of these two words and use them correctly in sentences. Note that among the figures that the following explanation refers to, the FIGS. 2, 3, 5, and 7 are flow charts describing the overview of the information processing procedures of the Device A of the current embodiment.

Figure 2:
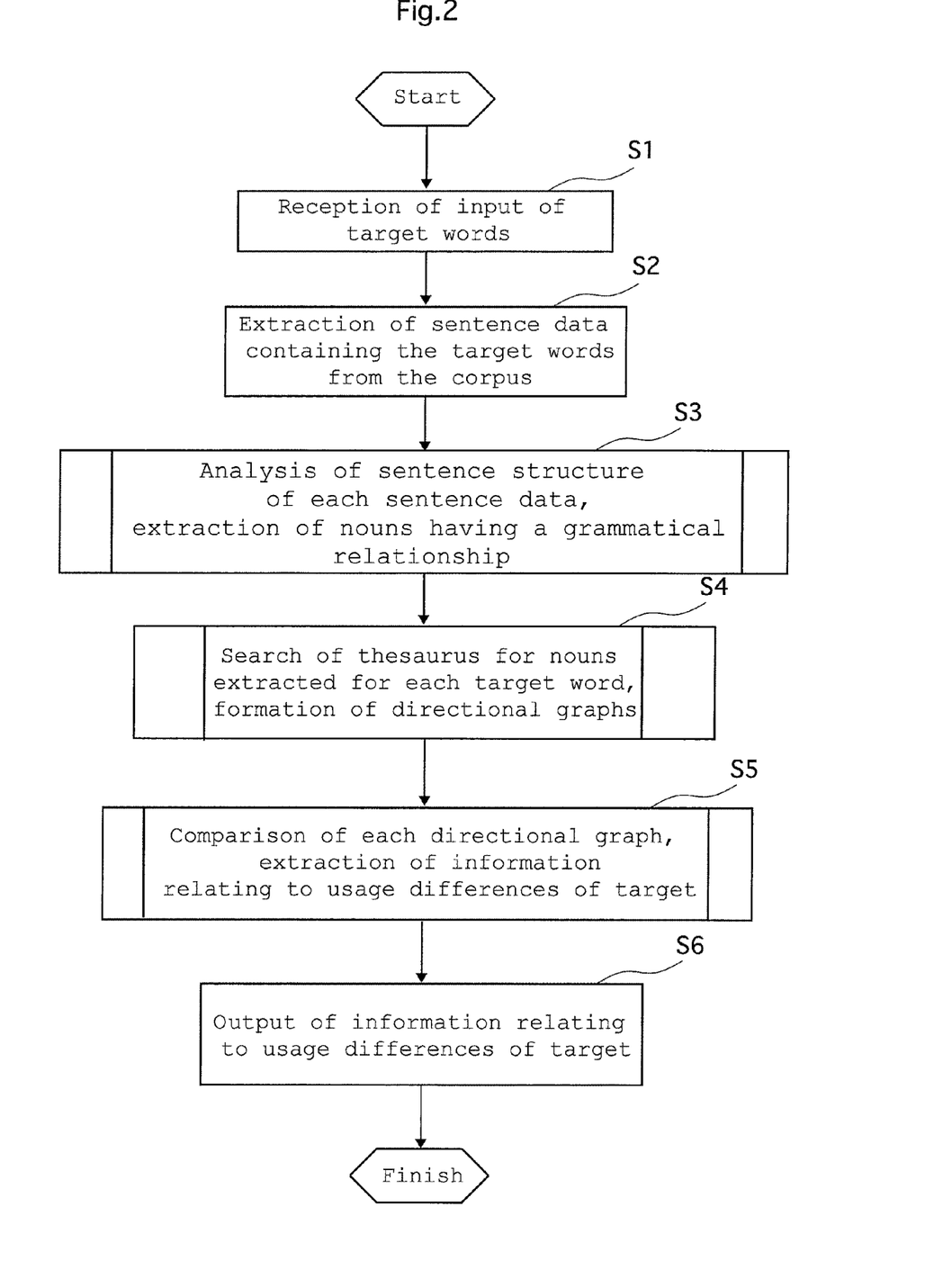
FIG. 2 is an overview of the entire course of the processing carried out by the word usage difference information acquisition program of the device shown in FIG. 1.

FIG. 2 shows a general overall outline of the processing performed by the device A of the current embodiment. That is to say, by operation of the keyboard or other input device by the user, the target word inputting means 1 receives input of the target word (e.g. "keen", and "eager") (S1). Then, the sentence extracting means 2 extracts sentence data containing the target word from the corpus DB1 (S2). Next, the noun extracting means 3 carries out a structural analysis of the sentence data, and extracts the nouns therefrom that have a grammatical relationship with the target word. Further, the directional graph forming means 4 searches the thesaurus DB2 for the nouns extracted for each respective target word, and forms a directional graph for each target word (S4). Still further, the difference extracting means 5 compares each directional graph (corresponding to the number of target words, in the above example there are two target words, so there will be two directional graphs), extracts information relating to the usage difference for each target word (S5), and finally, the difference outputting means 6 outputs information relating to the extracted usage differences by displaying said information on the display, or the like (S6). Hereinafter, the details of the content of the data processing carried out by each of the above-described means will be described.

First, the target word inputting means 1 is a target word inputting means for which the parts of speech of the target words for which input can be received is restricted to adjectives and verbs. In order to add this function to the target word inputting means 1 of the personal computer in which it should be implemented, a parts of speech analysis program may be incorporated, for example, into a portion of the program of the current embodiment. That is to say, the inputted words are searched in a dictionary database or the like, and if the part of speech of the word is found to be that of adjective or verb, input thereof is received, and the input of words for which the part of speech is other than adjective or verb is refused.

Further, the sentence extracting means 2 searches the corpus DB2 for the target words for which input has been received, and extracts all sentence data containing the target words. Here, by gathering as many usage examples as possible without limitation, including both sentences representing restricted usage methods and predicative usage methods, the reliability of the "information relating to usage differences" that is outputted as the final result can be increased.

Figure 3:
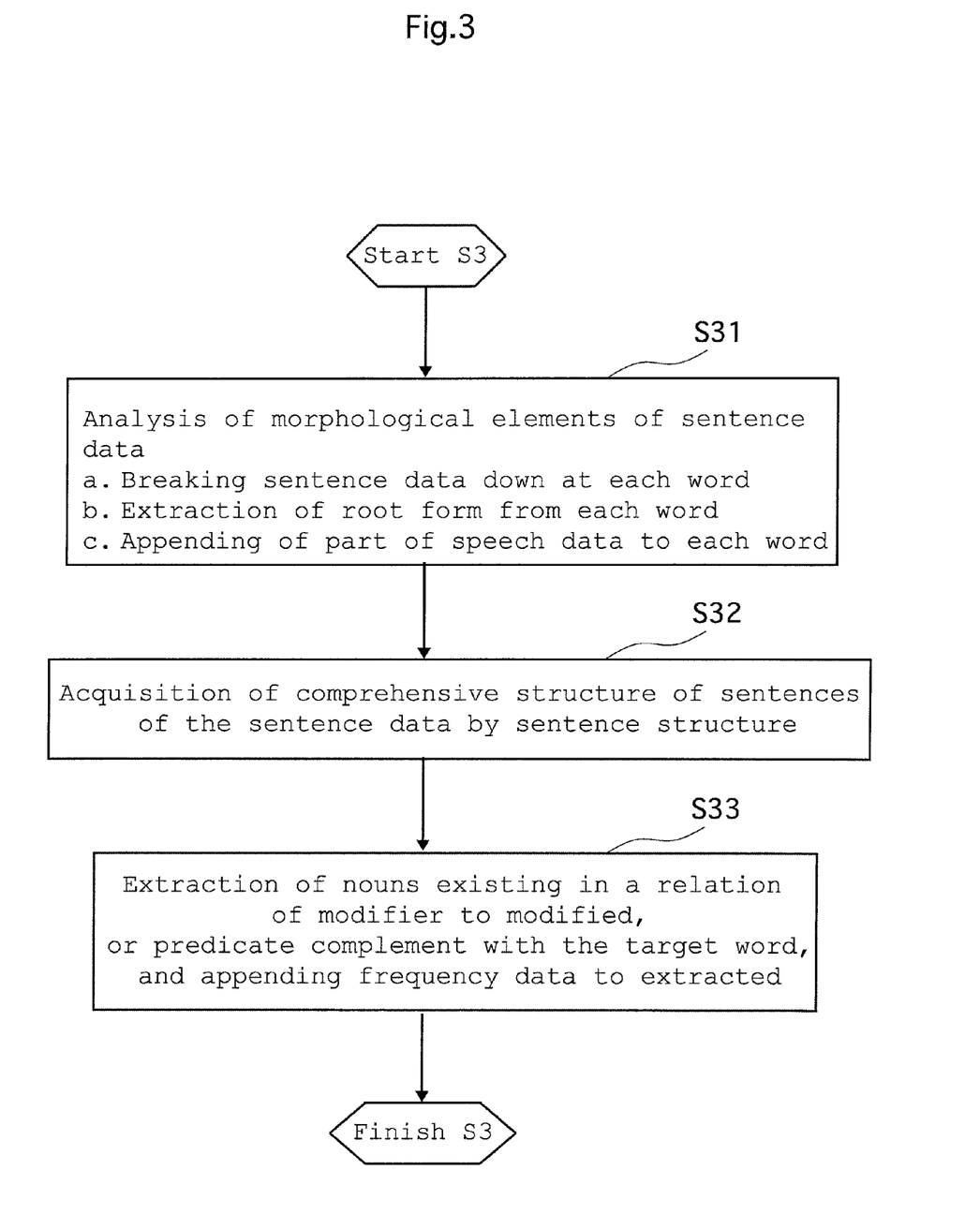
FIG. 3 is a flow chart showing the detailed processing of a portion (S3) of the processing course of FIG. 2.

In the processing procedure S3 performed by the noun extracting means 3, more specifically, processing such as that shown in FIG. 3 is executed. Note that the processing described below is executed for each target word, and for each sentence data. That is to say, to begin with, the sentence data extracted from the corpus DB1 is first subjected to a sentence data morphological elements analysis process (S31). In the aforementioned morphological element analysis process, more specifically: in the first stage (a), the sentence data is broken down at the points delimited by each constituent word; in the second stage (b), the root form of each word is extracted; and in the final stage (c), the part of speech data is appended to each word. Next, by subjecting the sentence data that has been subjected to the morphological analysis process to a syntactical analysis process, the syntactic structure of the sentence represented by a sentence data is obtained (S32), noun data of nouns having a predetermined grammatical relationship with the target term (modifier to modified, or a predicative relationship such as predicate to object, etc.) is identified, and said identified noun data is extracted. Because the above-described processing is executed for each target word and for each sentence data, the extracted noun data extracted for each target word has appended thereto frequency data representing the number of times said nouns appears in the sentence data.

Figure 4:
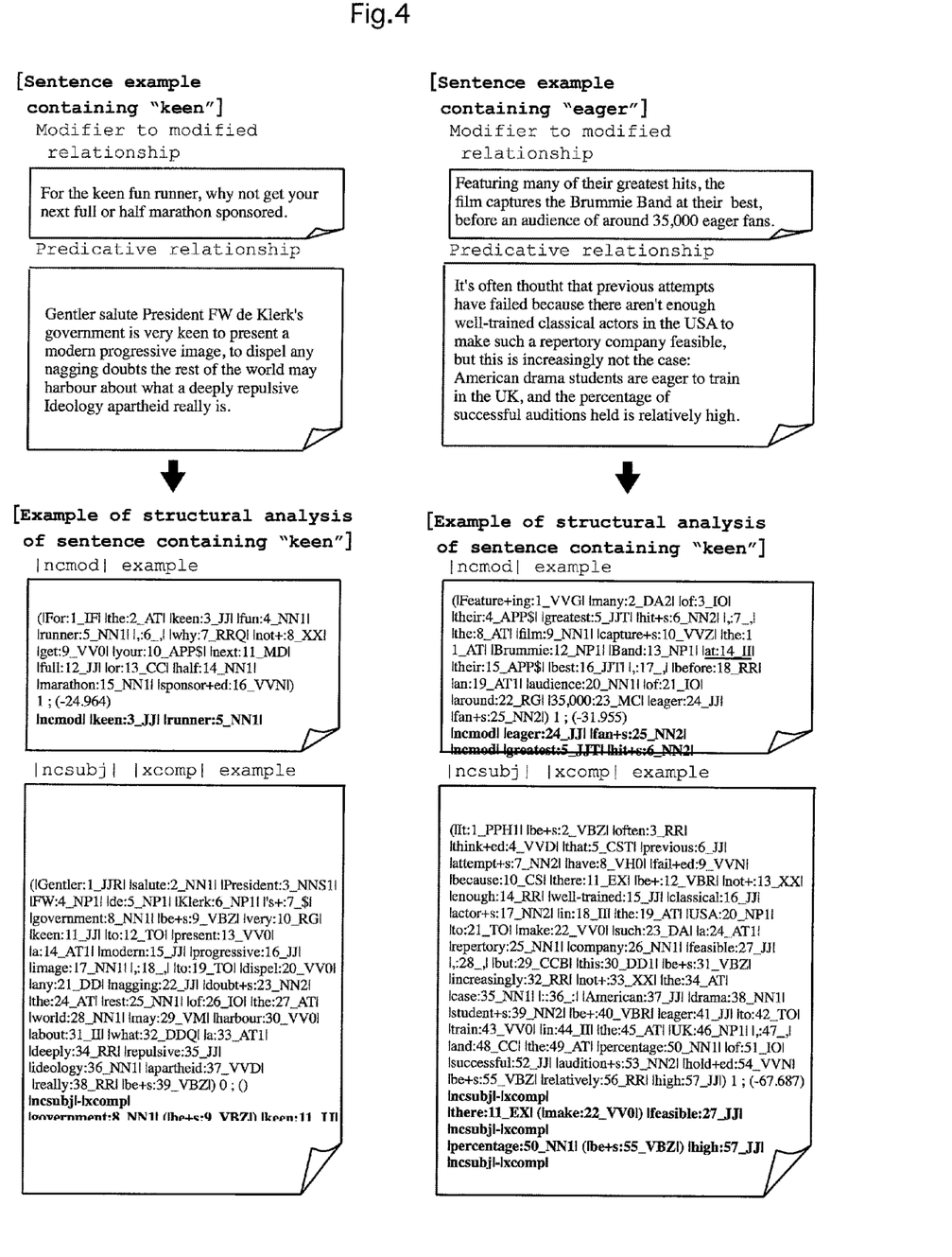
FIG. 4 shows a structural analysis example for a sentence that has been extracted from the corpus based on a target word inputted to the device of FIG. 1.

Here, the sentence structure analysis process will be described in detail. In addition to obtaining the part of speech data relating to the words, information specifying the higher order category obtained by searching the thesaurus (not required to be the above described thesaurus DB2), data specifying the predicate to object relationship obtained by searching a dictionary such as each frame dictionary (for example, in the case that the target word is a verb, information representing what types of nouns (i.e. nouns having what type of meaning) are obtained in the search), by performing processing utilizing, as required, processing rules that have been set, processing rules that have been set by mechanical learning rules, grammatical data extracted from an appropriate database (e.g. grammatical principles based on phrase structure grammar such as s→NP VP), co-occurrence data and the like, noun phrases and verb phrases can be identified, and phrases between which there is a phrase-to-phrase relationship can be identified, whereby comprehensive structural data can be obtained. In the sentence structure analysis process, a generally known sentence structure analysis program can be used; however, in the current embodiment, the parser program (a program capable of analyzing the grammatical relationship between each vocabulary word) RASP (Robust Accurate Statistical Parsing) is used as an example. FIG. 4 shows a sample of usage example sentences (one limited usage method and one predicative usage method (subject complement) each) extracted by RASP from the corpus DB1 including each of the target words "keen" and "eager" Extraction by RASP enables obtainment of the morphological elements results (shown in the parentheses in the upper level), and the syntactic structure of the sentence (the bolded portion in the lower level). In the morphological elements analysis results, the words (root form) are demarcated between the upright lines | |, and information indicating the order (a numeral) in which the word was extracted from the sentence as well as the part of speech of the word is appended to each word. The syntactic structure of the sentence includes the grammatical relationships represented as |ncmod| (limited usage method, modifier to modified relationship), or |ncsubj|−|xcompl| (predicative usage method, subject to predicate relationship), with the words that exist in each grammatical relationship listed to the right of the respective grammatical relationship (though it goes without saying, one side is the target word).

In particular, the settings for the RASP structural analysis processing rules are as follows in the current embodiment. That is to say, regarding "|ncmod|", among the words extracted as |ncmod| by RASP, only those words existing in a relationship of modifier to modified are extracted as the grammatical relationship |ncmod|. Here, words whose part of speech is adjective are preceded by JJ, words whose part of speech is noun are preceded by any of NN, PN, VVG, and PP. Further, because there are many cases in which words preceded by NP are one part of a compound term, words preceded by NP are categorized as adjectives and have the relationship of |ncmod|; moreover, if there is a relationship of |ncmod| with a noun, words that are preceded by the part of speech NP are categorized as having the relationship of |ncmod| between the adjective and noun, and the adjective and noun are extracted as having the relationship of |ncmod|. If an adjective and a noun are related by way of a proposition, only when the proposition is "of" is the relationship between the adjective and noun extracted as |ncmod|. Regarding the relationship |ncsubj|−|xcompl|, in the case that a word having a relationship of |ncsubj| with a noun exists in a relationship of |xcompl| with an adjective, the noun and adjective are extracted as having the relationship of |ncsubj|−|xcompl|. However, in the above-described case, only the following words may serve as a linking term between the noun and adjective]: be, find, become, make, seem, appear, feel, look, sound, smell, taste, remain, keep, stay, come, end-up, get, go, grow, prove, turn, turn out, wind-up, burn, lie, loom, play, plead, rest, stand, stand-up, blush, fall, fall-down, freeze, run, slam, spring, wax.

However, if an adjective and noun are related by way of a preposition they will not be extracted. Further, if the word "that" appears to the right of an adjective (i.e. "it is <adj> that . . . ) the word will not be extracted. Note that the relationship |dobj|1−|xcmop| (predicative usage method, verb to object relationship) can be given as an example as another type of grammatical relationship aside from those described above. In that case, the rules for the RASP structural analysis processing may be as follows. That is to say, in the case that a word having a relationship of |dobj| with a noun exists in a relationship of |xcomp| with an adjective, the noun and adjective are extracted as having the relationship of |dobj|–|xcomp|. If a word preceded by NP is a word having a relationship of |dobj| with a given word, and also exists in a relationship of |ncmod| with a noun, the word preceded by NP is first replaced with a noun existing in a relationship of |ncmod|, and then extracted as the relationship of |dobj|–|xcomp|. However, in the above-described case, only the following words may serve as a linking term between the noun and adjective]:

hold, keep, leave, call, confess, profess, pronounce, report, like, prefer, want, wish, believe, consider, deem, find, hold, imagine, judge, presume, rate, reckon, suppose, think, drive, get, make, prove, render, send, turn, certify, declare, proclaim.

However, if an adjective and noun are related by way of a preposition they will not be extracted. Further, if the word "that" appears to the right of an adjective (i.e. "it is <JJ> that . . . ) the word will not be extracted.

Next, the thesaurus DB2 searched by the directional graph forming means 4 will be explained briefly. The thesaurus DB2 employed in the current embodiment, WordNet 2.0, is a directional data structure having a network structure, and each node og the directional graph represents a word or a category (concept). If there is a higher/lower relationship in meaning between nodes, a link is drawn between the nodes. All nodes have a link drawn between itself and at least one other node: the highest level node is referred to as a "Root"; and the lowest level node is a word (refer to FIG. 6, in which the lowest node is preceded by an "@".

Figure 5:
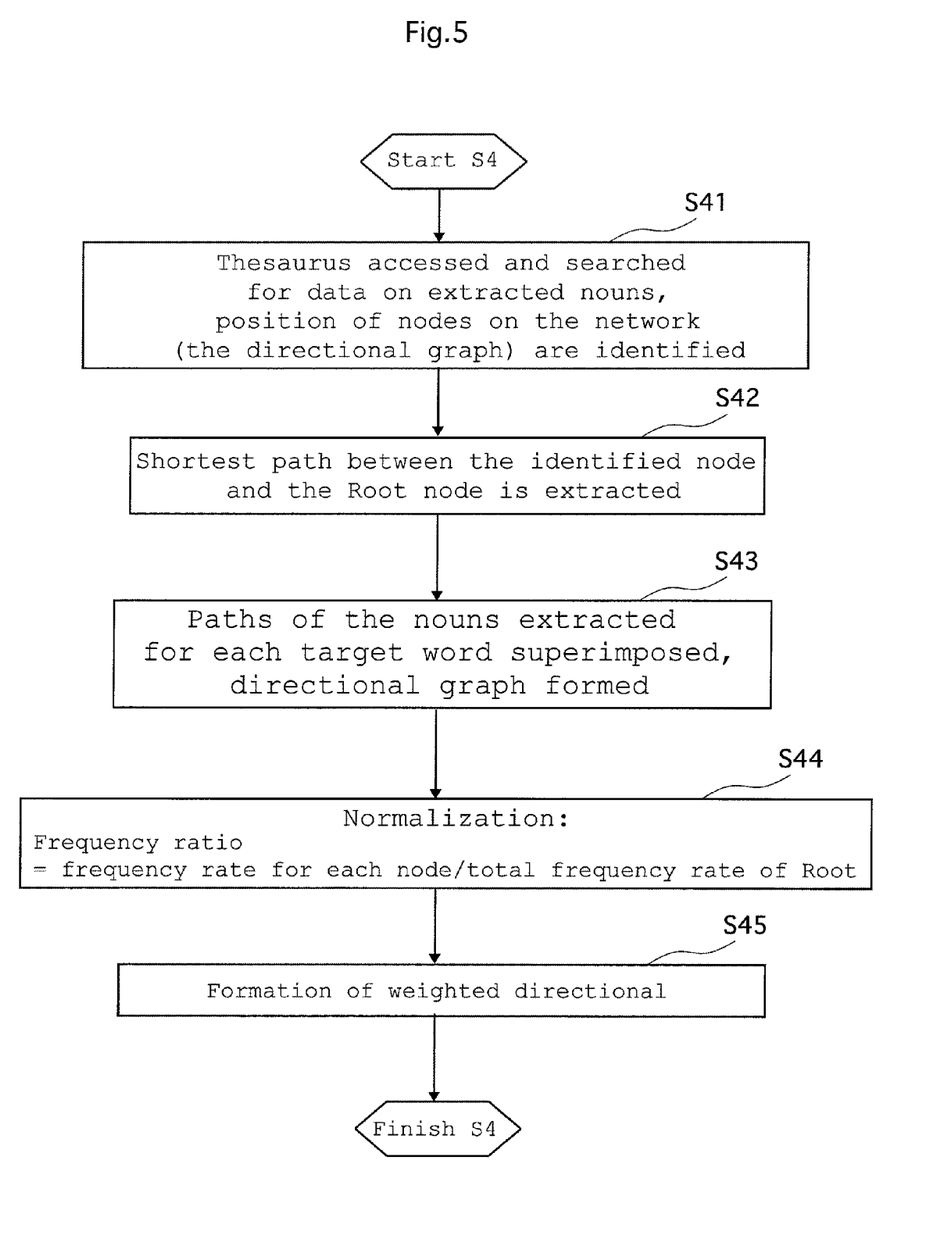
FIG. 5 is a flow chart showing the detailed processing of a portion (S4) of the processing course of FIG. 2.

In the processing procedure S4 performed by the directional graph forming means 4, more specifically, processing such as that shown in FIG. 5 is executed. First, the thesaurus DB2 is accessed, each noun data corresponding to the nouns extracted by the above-described noun extracting means is searched, and the position of the node on the network (the directional graph) at which each searched noun appears is identified (S41). Then, the shortest path (the path through the link and the node) connecting each identified node and the Root node (highest rank node) is extracted (S42). Continuing, the directional graph is formed by superimposing the paths extracted in the preceding process for all nouns extracted for each target word (S43). The directional graph formed in this procedure is in the form of a portion of a directional graph that has been cut out from the directional graph of the original thesaurus DB2, and if the formed graph is considered as representing an expanded view of the meaning of the target words, it can be said that nodes at the time of the superimposition of the paths for which the rate of overlap is high, that the higher the rate of overlap for a node, the higher the frequency that the category of meaning of said node appears in the corpus DB1. Further, in the next procedure, by dividing the number of overlaps for each node by the number of overlaps for the Root node, the frequency rate (appearance rate) of each node can be calculated (S44). The frequency rate of the Root node is 1, and the frequency rate for the node of each word if the value calculated by dividing the rate of appearance of each said word by the rate of appearance of the co-occurrence of all extracted nouns for the same target word. Through this process, a directional graph in which the frequency rate has been appended to each node (hereinafter referred to as a "weighted directional graph") is formed (S45). That is to say, the weighted directional graph is a directional graph in which the expanded view of the meaning of a target word has been weighted with the frequency of co-occurrence of nouns in the corpus DB1. FIG. 6 shows an example of a weighted directional graph formed for the target words "keen" and "eager".

Figure 7:
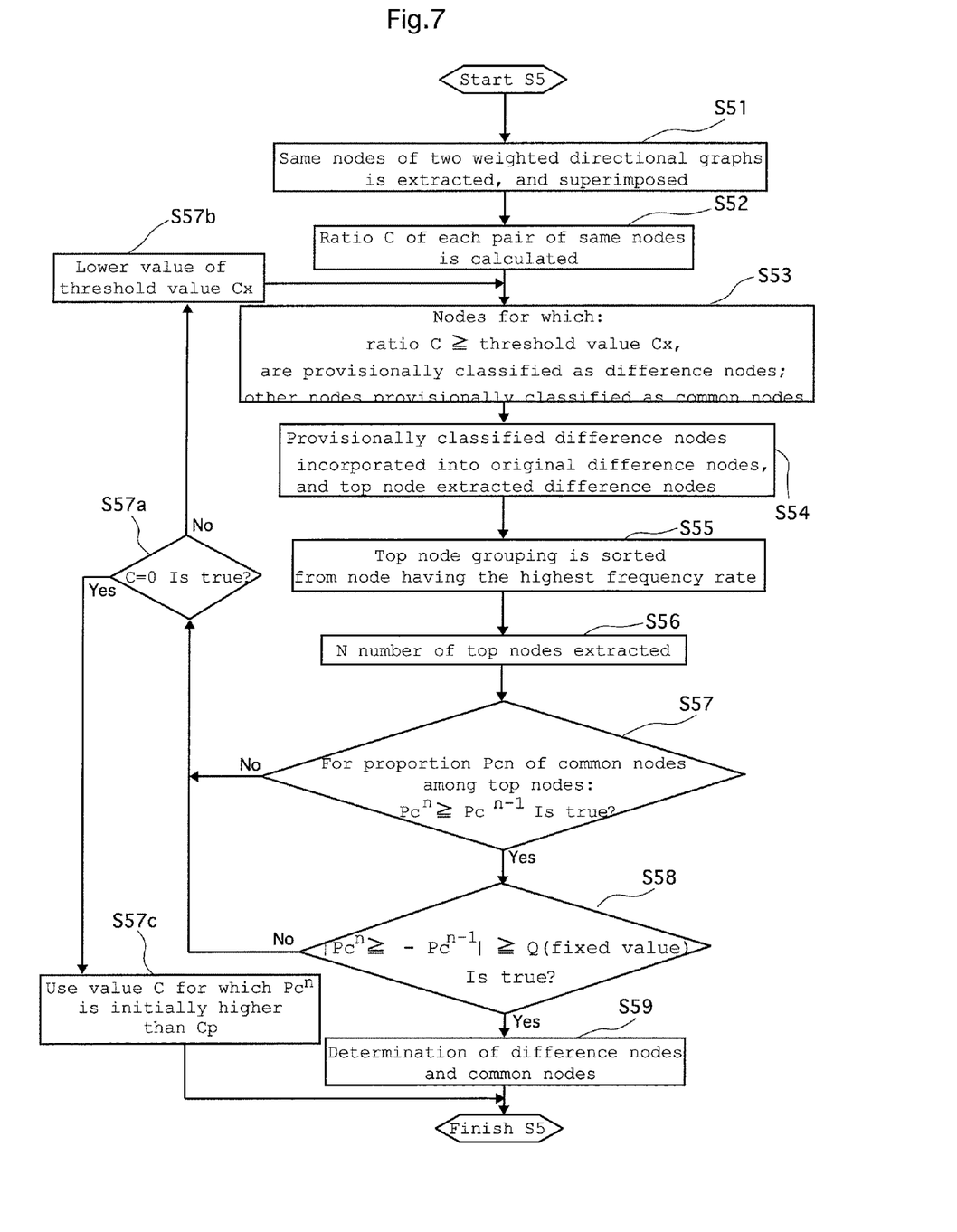
FIG. 7 is a flow chart showing the detailed processing of a portion (S5) of the processing course of FIG. 2.
Figure 8:
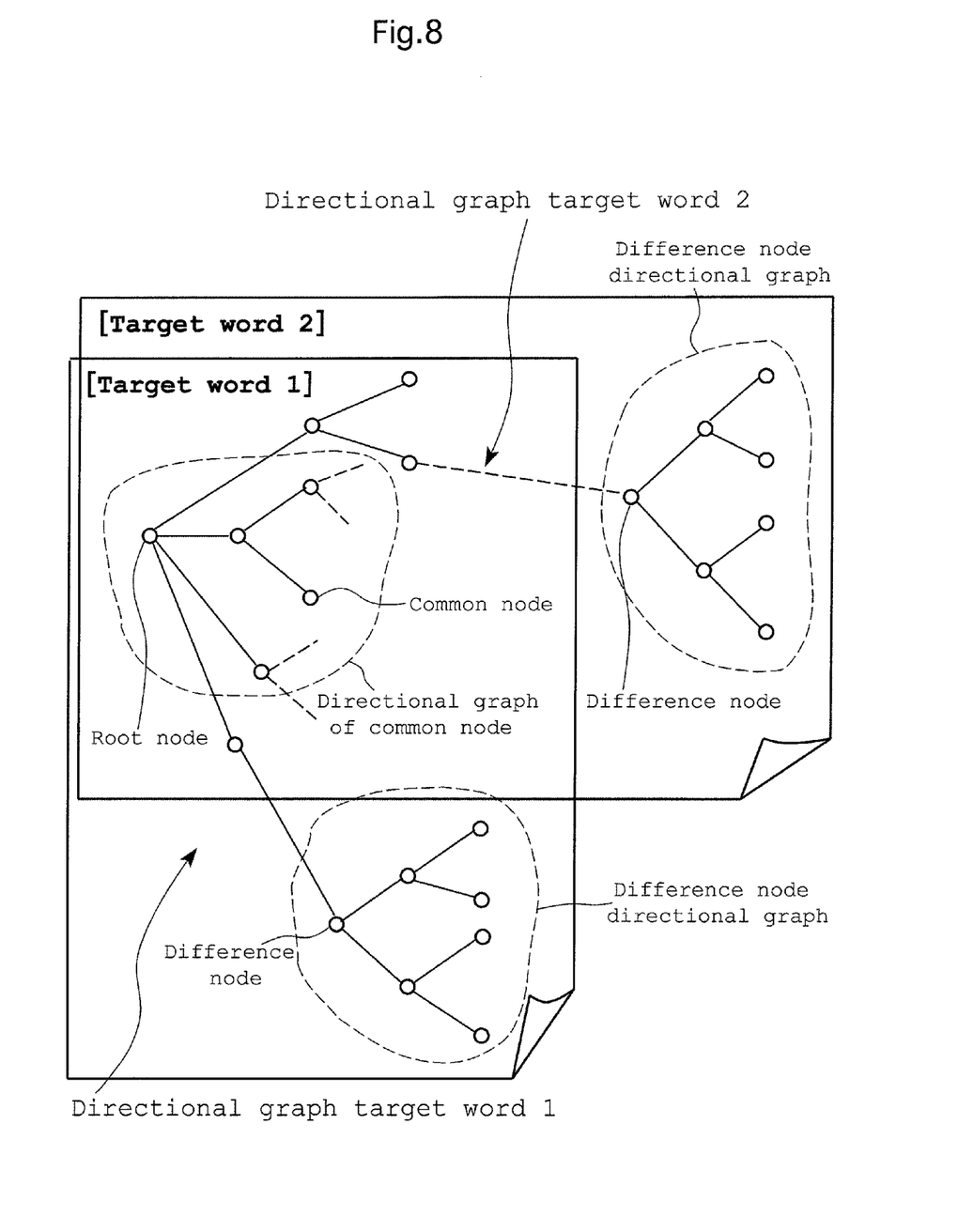
FIG. 8 shows an image of the directional graph superimposition processing carried out in the course of the processing portion S5 of FIG. 7.

Next, in the processing procedure S5 performed by the difference extracting means 5, more specifically, processing such as that shown in FIG. 7 is executed. First, procedure the same node is extracted from two weighted directional graphs which were formed in procedure S45 to be compared, and the weighted graphs are superimposed (S51). By way of this process, the common nodes and the distinction nodes between the two weighted directional graphs can roughly be distinguished. FIG. 8 shows an image of the superimposition process. In FIG. 8, nodes are indicated by a small hollow circle symbol, and a link between two nodes is shown as a solid line connecting the two nodes. Here, the boundary between the node among the common nodes on the directional graph that has the lowest rank with respect to meaning (bottom node) and the node among the distinction node that on the directional graph that has the highest rank with respect to meaning (top node) is the border between the common portions and the difference portions of the expanded views of meaning of the two target words, and can be said to be a portion representing the difference in meaning between the two target words to a remarkable degree. When distinguishing between the differences in usage of the two target words, the results obtained by determining the top node or nodes below the top node to be distinction nodes and completing the processing procedure S5 performed by the difference extracting means 5 may be used; however, because there are cases in which the difference in the frequency rate will be remarkable even for common nodes, particularly when the difference therebetween is great, it is preferable that the common nodes between which said difference in frequency rate is remarkable be treated as difference nodes.

Then, as the next procedure, the frequency ratio, ratio C, is calculated for the same nodes (S52). Normally, these same nodes have mutually different frequency ratios in their respective weighted directional graphs. However, the calculation of the ratio C is performed with the larger value of the frequencies ratios as the denominator so that the calculated value is less than or equal to 1. Next, the calculated ratio C is compared to a threshold value Cx, whereby the nodes for which the ratio C has been calculated can be provisionally classified as common nodes and difference nodes. Here, a positive number having a value less than or equal to 1 can be used as the default value of the threshold value Cx; however, it is preferable that the value of the ratio of the frequency ratios occurring in the vicinity of the bottom node is used. More specifically, the processing may be performed such that in the case that the ratio C for a node is greater than or equal to the threshold value Cx, the node is provisionally classified as a difference node, and for a node of which the ratio C is less than or equal to threshold value Cx (i.e. all other cases), the node is classified as a common node (S53). Nodes that are provisionally classified as difference nodes in this processing are incorporated into the portion for which the nodes thereof were originally classified as difference node in procedure S51, a directional graph is formed from the difference nodes (the nodes originally and provisionally classified as such) and all top nodes are extracted therefrom. Then, the grouping of top nodes for each target word are sorted in order starting from the node with the highest frequency ratio (S55), and the top nodes of the predetermined high rank number (N) are extracted. The extraction number N is an arbitrary value, however, it is normally desirable that a value between 10 and 100 is used, and preferable a value near 20 is adequate; in the current embodiment, N=20. Next, a determination is made as to whether or not the value $P_c^n$ calculated for nodes provisionally classified as nodes common to the directional graphs of both target words is greater than or equal to the predetermined value Cp (S57). A convenient value can be used for the value Cp, however, it is preferable that a value between 0.3 o 0.7 is used, and even more preferable if the value is approximately 0.5; in the current embodiment is Cp=0.5. Here, if the value $P_c^n$ of the common nodes is less than the value Cp, a determination is once made as to whether or not the ratio C is 0 (S57a); if a result other than C=0 is obtained (S57 returns No), the threshold value Cx is uniformly reduced, and the processing returns to procedure S53 (S57b). Note that a convenient value (e.g. 0.1) can be used for the changed value of the threshold value Cx in procedure S57. On the other hand, if C=0 (S57 returns Yes), the value of the ratio C, which is higher than the value Cp from the beginning is used as the value $P_c^n$ of the common nodes (S57c), and the processing of the current procedure S5 is completed. Further, if the value $P_c^n$ of the common nodes is greater than or equal to a predetermined value (S57 returns Yes), the value $P_c^n$ of the common nodes is compared to the value $P_c^{n-1}$ of the common nodes that was obtained in the previous processing cycle for the procedure S53 (excluding the first processing cycle of the procedure S53), and a determination is made as to whether or not the comparison value is greater than or equal to a fixed value Q (S58); that is to say, a determination is made as to whether or not there has been a drastic change in the comparison value. The comparison processing can use the difference of both values (i.e. $|P_c^n - P_c^{n-1}|$), or a ratio of the two values (i.e. $P_c^n / P_c^{n-1}$). The current embodiment uses the difference between the absolute values, and the value Q that becomes the evaluation criterion is 4/20 (0.2). However, the value Q is n arbitrary value, and optimization of the value may aimed for by, for example, applying a machine learning method. Further, if the value resulting from the comparison process is less than the fixed value Q (S58 returns No), the processing returns to the procedure S57; however, if the comparison value is greater than or equal to the fixed value Q (S58 returns Yes), because it can be thought that the difference in frequency is remarkably high even though it is a common node, nodes that were provisionally determined to the difference nodes in procedure S53 are finally determined to be difference nodes, and conversely, nodes that were provisionally determined to be common nodes in procedure S53 are finally determined to be common nodes (S59). As described above, the processing of the procedure S5 by the difference extracting means 5 is thereby completed.

By performing processing such as that described above, the nodes included in two weighted directional graphs that should be compared are classified into common nodes and difference nodes. Note that, in the processing performed next by the difference outputting means 6, the information relating to the difference in usage between the target words used can be formed by: extracting all or a portion of only the top nodes (a portion of the nodes with a high frequency ratio, or a random portion) of the nodes determined in the procedure S59; extracting all of the difference nodes included among the extracted top nodes; extracting a predetermined number of high ranking difference nodes (or a predetermined random number) included among the top nodes; or extracting the lowest rank difference node (a node representing a noun) by tracing the nodes on a directional graph formed from the top nodes. Further, by setting the top nodes of the difference nodes, because the nodes of the conceptual rank directly thereabove can be extracted as the lowest ranking common nodes (the bottom nodes), it is possible to use the node extracted bottom nodes or a portion thereof as the information relating to the difference in usage of the target words (as the inverse of the meaning of said information, the lowest limit common concept of the meaning of the compared target words). According to the current embodiment, the difference extracting means 6 puts in order and extracts a predetermined number of the top nodes of the difference nodes starting from the node with the highest frequency ratio and a predetermined number of the lowest ranking word nodes traced down from each top node, or, in addition to the aforementioned nodes, a predetermined number of nodes starting from the node with the lowest frequency ratio among the bottom nodes of the common nodes as well as the nodes ranking directly above said each predetermined number of nodes conceptually, as the information relating to the difference in usage of the target words.

Figure 9:
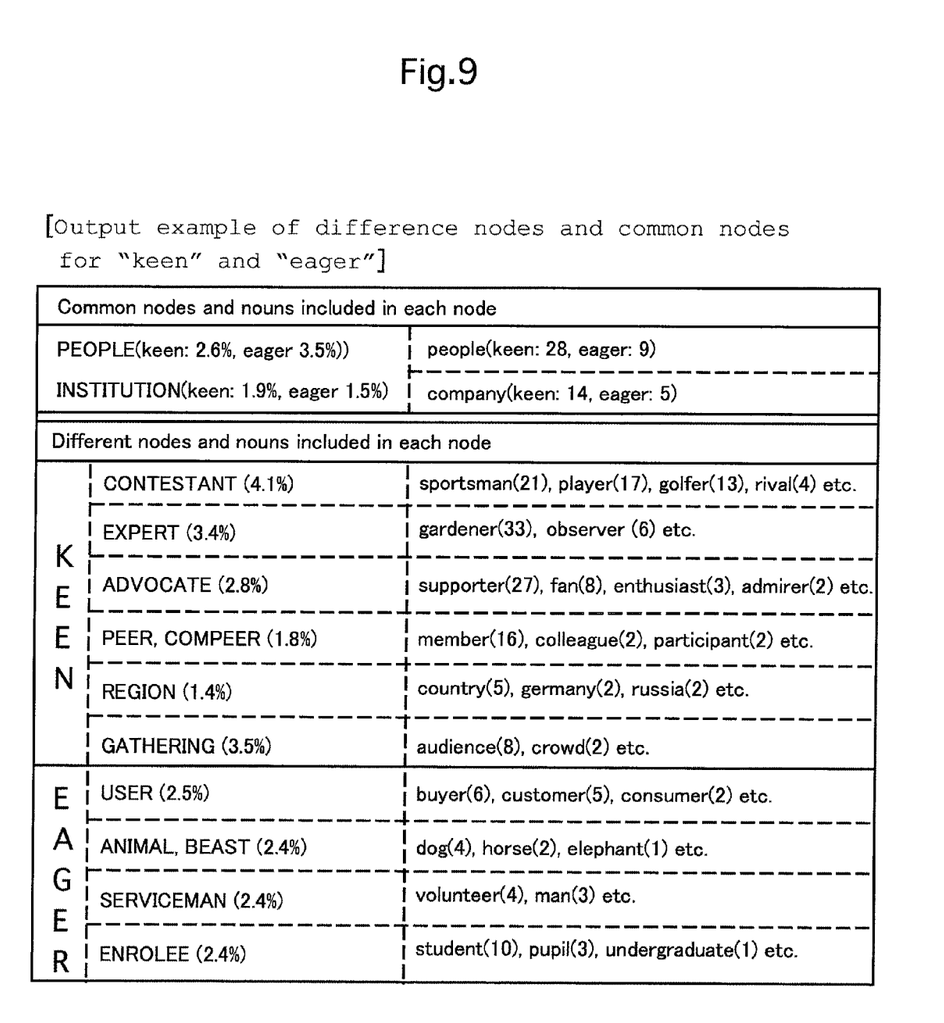
FIG. 9 shows an output example outputted by the processing portion S6 of FIG. 2.

FIG. 9 shows an example of a screen view or a print out occurring in the case in which the target words are "keen" and "eager". The upper section of the table shows the common nodes for "keen" and eager", and the lower section shows the difference nodes therefore. In the upper section of the table of FIG. 9, the column on the right shows the bottom nodes (words) of the common nodes, and the right column contains the nodes of the conceptual rank directly above the nodes shows in the right column. The left column of the lower section of the table shown in FIG. 9 shows separate sections for "keen" and "eager", with the central column representing the top nodes of the respective difference nodes, and the right column representing the lower level word nodes for each corresponding top node. From the above example the user can see the usage differences of the two target words in that "keen" tends to be used in sentences having meanings associated with activities presuming competition (e.g. sportsman, player), with agents working in a specialized field (e.g. gardener), agents with an extreme degree of enthusiasm or desire for something (e.g. supporter, fan), and so on, retaining the "negative and extreme features of intensity" included in its original meaning of "acute pain, sharpness of a blade, intenseness), whereas "eager" strongly tends to be used in association with naturally positive agents wanting to perform an enjoyable activity (e.g. audience, buyer, volunteer), retaining more of its naturalness of desire contained in its original meaning of appetite than stimulation.

Note that the present invention is not limited to the above-described embodiment. For example, it is possible to input three or more target words. In that case, a directional graph is formed for each target word, all of the directional graphs except for one are superimposed to form a new directional graph, the new directional graph and the remaining directional graph are compared, whereby information relating to the usage difference of a target word and other target words can be obtained. Further, even by simply superimposing the directional graphs of all the target words, information revealing the overall basic differences in usage between the target words can be obtained. Aside from those embodiments, embodiments in which the weighting based on frequency is not performed, or embodiments in which the frequency value is used instead of the frequency ratio, and various other changes are possible. Further, the device or program according to the present invention may be applied as a portion of another sentence inputting program, language learning program, translation program, and the like, and operated in conjunction therewith. Still further, each of the configurations and processing procedures described above are not limited to being of the type of the above-described embodiment, and so long as the scope of the intent of present invention is not exceeded, various variations are possible.

According to the present invention, because information relating to the difference in usage between words having the same or similar meaning can be obtained, the invention can be used in language study or vocabulary checking applications. Further, if the program or device of the present invention is, for example, used in with language learning software, sentence inputting software, translation software, or in a device incorporating any of said software, the usefulness of the present invention does not cease simply at the extraction and indication of grammatical errors, but can be applied in providing support for input and editing based on usage examples.

We claim:

1. A computer searchably provided with, or connected to, a corpus, which is a usage example database containing example sentences for a plurality of target vocabulary terms having the same or similar meaning, and a thesaurus, which is a database describing the word-to-word relationship between one word and another within a conceptual hierarchy, a word use difference information acquisition program for extracting and outputting information relating to the difference in usage for a plurality of target terms having the same or similar meaning, said word use difference information acquisition program configured to cause the computer to execute processing comprising:

a target word inputting step of receiving the input of a plurality of target words, a sentence extracting step for accessing the corpus, searching the corpus for each target word for which input thereof has been received in the target word inputting step, and extracting from the corpus each sentence data containing any of said target words, a noun extracting step for analyzing the structure of each sentence data extracted in the sentence extracting step, and extracting from each sentence data nouns that exist in a grammatical relationship with the target word contained therein, a directional graph forming step for accessing the thesaurus, searching the thesaurus for the nouns extracted in the noun extracting step, extracting a node representing each of said nouns and a node representing the higher ranking conceptual category with respect to each said noun, and forming a directional graph constructed from the thus extracted nodes and links that connect respective higher and lower ranking nodes and show the relationship therebetween with respect to the conceptual hierarchy, for each corresponding target word, a difference extracting step for comparing each of the directional graphs formed in the directional graph forming step, and extracting the difference nodes between the directional graphs of different target words, and a difference outputting step for outputting the difference between the directional graphs extracted in the difference extracting step as information representing difference in usage between the target words.

2. The computer of claim 1, wherein in the difference extracting step, the computer executes processing in which
   the difference nodes are extracted by demarcating as shared the same nodes or portions linked to said same nodes occurring in each of the directional graphs, and superimposing each of said directional graphs.

3. The computer of claim 1, wherein if the number of target words received in the target word inputting step is three or more, in the difference extracting step, the computer is caused to execute processing in which
   each of the directional graphs formed for a plurality of target words aside from a single specific target word are combined to form a common directional graph, and said common directional graph is compared with the directional graph of said single specific target word, and the difference nodes between said directional graphs are extracted, and the procedure of extracting the difference nodes between a common directional graph and a directional graph of a single specific target word is repeated for each target word of said plurality of target words utilizing each of said target words as said single specific target word.

4. The computer of claim 1, wherein the computer is caused to execute processing in which
   in the noun extracting step, the nouns contained in each sentence data and existing therein in a grammatical relationship with the target word are extracted together with data relating to the frequency with which said each noun appears with the target word in the sentence data,
   in the directional graph forming step, each node of the directional graphs to be formed is weighted with the data relating to the frequency, and
   in the difference extracting step, each of the weighted directional graphs is compared, utilizing the weighted directional graphs formed in the directional graph forming step, and the difference nodes between the weighted directional graphs of different target words are extracted.

5. The computer of claim 4, wherein a frequency ratio representing a ratio of a rate of a frequency of co-occurrence with a corresponding target word occupied by each of the nouns extracted for said corresponding target word to a total rate of the frequency of co-occurrence with the corresponding target word for all of said nouns combined is applied as the data relating to frequency in the noun extracting step, and the computer is caused to execute processing in which
   in the directional graph forming step, the directional graphs are weighted based on said frequency ratio by appending the frequency to the nodes corresponding to the nouns in the directional graphs that are to be formed, appending the total value of the combined frequencies of said nodes representing the nouns to the node representing the higher conceptual category thereof, and appending to all nodes a frequency ratio that is a normalization of each of the individual frequencies,
   in the difference extracting step, the ratio of the frequency rates of a same node occurring in each of two weighted directional graphs formed in the directional graph forming step and which are subjects for comparison is calculated for each same node, and
   the nodes for which the ratio calculated thereof is greater than or equal to a predetermined value are incorporated into the difference nodes, which are the distinctive nodes, and said difference nodes are extracted.

6. The computer of claim 5, wherein in the difference extracting step, the computer is caused to execute processing in which a procedure wherein a ratio of the frequency rate of a same node occurring in two directional graphs that are subjects for comparison is calculated for each of said same nodes,
   if the calculated ratio is greater than or equal to a predetermined value, said same node is provisionally incorporated into the difference portion of the directional graph as a difference node,
   a predetermined number of the top nodes within said difference portion are extracted for each target word in the order starting with the top node having the largest frequency and the proportion of common nodes among the extracted nodes is calculated, and the procedure of calculating the proportion of common nodes among the extracted nodes is repeated while the frequency ratio is gradually diminished, whereby, if the proportion of the common nodes calculated in each iteration of the procedure is greater than or equal to a fixed value, said proportion of common nodes is compared to the proportion of common nodes calculated in the previous iteration of the procedure, and if the compared value is greater than or equal to a fixed value, the nodes that were provisionally determined in that iteration of the procedure to be difference nodes are determined finally to be difference nodes, and said nodes are extracted as difference nodes.

7. The computer of claim 5, wherein the frequency value itself is used instead of the frequency ratio.

8. The computer of claim 4, wherein the computer is caused to execute processing in which
in the difference extracting step, the extracted difference nodes are subjected to a further extraction process wherein a predetermined number thereof are again extracted in the order starting from the extracted difference node of which the weighting based on frequency is greatest, and
in the difference outputting step, the predetermined number of extracted nodes is outputted as the information relating to the difference in usage of the target words.

9. The computer of claim 1, wherein the computer is caused to execute processing in which
in the difference outputting step, the top node of the difference nodes is outputted as the information relating to the difference in usage of the target words.

10. The computer of claim 1, wherein the computer is caused to execute processing in which
in the difference outputting step, in addition to, or instead of, the top node of the difference nodes, the bottom node of the common nodes is outputted as the information relating to the difference in usage of the target words.

11. The computer of claim 1, wherein the computer is caused to execute processing in which
in the target word inputting step, the part of speech of the target words is restricted to adjective or verb.

12. A word use difference information acquisition device configured by a computer that is operated according to a program and which extracts and outputs information relating to the difference in usage for a plurality of target terms having the same or similar meaning, said computer being searchably provided with, or connected to, a corpus, which is a usage example database containing example sentences for a plurality of target vocabulary terms having the same or similar meaning, and a thesaurus, which is a database describing the word-to-word relationship between one word and another within a conceptual hierarchy, and comprising:
a target word inputting means for receiving the input of a plurality of target words,
a sentence extracting means for accessing the corpus, searching the corpus for each target word for which input thereof has been received by the target word inputting means, and extracting from the corpus each sentence data containing any of said target words,
a noun extracting means for analyzing the structure of each sentence data extracted by the sentence extracting means, and extracting from each sentence data nouns that exist in a grammatical relationship with the target word contained therein,
a directional graph forming means for accessing the thesaurus, searching the thesaurus for the nouns extracted by the noun extracting means, extracting a node representing each of said nouns and a node representing the higher ranking conceptual category with respect to each said noun, and forming a directional graph constructed from the thus extracted nodes and links that connect respective higher and lower ranking nodes and show the relationship therebetween with respect to the conceptual hierarchy, for each corresponding target word,
a difference extracting means for comparing each of the directional graphs formed in the directional graph forming means, and extracting the difference nodes between the directional graphs of different target words, and
a difference outputting means for outputting the difference between the directional graphs extracted in the difference extracting means as information representing difference in usage between the target words.

13. A word use difference information acquisition device as described in claim 12, wherein
the difference extracting means extracts the difference nodes by demarcating as shared the common nodes or portions linked to the common nodes occurring in each of the directional graphs, and superimposing each of said directional graphs.

14. A word use difference information acquisition device as described in claim 12, wherein if the number of target words received by the target word inputting means is three or more, the difference extracting means executes processing wherein
each of the directional graphs formed for a plurality of target words aside from a single specific target word are combined to form a common directional graph, and said common directional graph is compared with the directional graph of said single specific target word, and the difference nodes between said directional graphs are extracted, and the procedure of extracting the difference nodes between a common directional graph and a directional graph of a single specific target word is repeated for each target word of said plurality of target words utilizing each of said target words as said single specific target word.

15. A word use difference information acquisition device as described in claim 12, wherein the difference extracting means executes processing in which in the noun extracting step, the nouns contained in each sentence data and existing therein in a grammatical relationship with the target word are extracted together with data relating to the frequency with which said each noun co-occurs with the target word in the sentence data,
the directional graph forming means executes processing wherein each node of the directional graphs to be formed is weighted with the data relating to the frequency, and
the difference extracting means compares each of the weighted directional graphs, utilizing the weighted directional graphs formed by the directional graph forming means, and extracts the difference nodes between the weighted directional graphs of different target words.

16. A word use difference information acquisition device as described in claim 15, wherein
a frequency ratio representing a ratio of a rate of a frequency of co-occurrence with a corresponding target word occupied by each of the nouns extracted for said corresponding target word to a total rate of the frequency of co-occurrence with the corresponding target word for all of said nouns combined is used as the data relating to frequency by the noun extracting means, and
the directional graph forming means executes processing wherein the directional graphs are weighted based on said frequency ratio by appending the frequency to the nodes corresponding to the nouns in the directional graphs that are to be formed, appending the total value of the combined frequencies of said nodes representing the nouns to the node representing the higher conceptual category thereof, and appending to all nodes a frequency ratio that is a normalization of each of the individual frequencies, the difference extracting means executes processing wherein the ratio of the frequency rates of a same node occurring in each of two weighted directional graphs formed in the directional graph forming step and which are subjects for comparison is calculated for each same node, and the nodes for which the ratio calculated thereof is greater than or equal to a predetermined value are incorporated into the difference nodes, which are the distinctive nodes, and said difference nodes are extracted.

17. A word use difference information acquisition device as described in claim 16, wherein the difference extracting means executes processing wherein a procedure in which a procedure wherein a ratio of the frequency rate of a same node occurring in two directional graphs that are subjects for comparison is calculated for each of said same nodes, if the calculated ratio is greater than or equal to a predetermined value, said same node is provisionally incorporated into the difference portion of the directional graph as a difference node, a predetermined number of the top nodes within said difference portion are extracted for each target word in the order starting with the top node having the largest frequency and the proportion of common nodes among the extracted nodes is calculated, and the procedure of calculating the proportion of common nodes among the extracted nodes is repeated while the frequency ratio is gradually diminished, whereby, if the proportion of the common nodes calculated in each iteration of the procedure is greater than or equal to a fixed value, said proportion of common nodes is compared to the proportion of common nodes calculated in the previous iteration of the procedure, and if the compared value is greater than or equal to a fixed value, the nodes that were provisionally determined in that iteration of the procedure to be difference nodes are determined finally to be difference nodes, and said nodes are extracted as difference nodes.

18. A word use difference information acquisition device as described in claim 16, wherein the frequency value itself is used instead of the frequency ratio.

19. A word use difference information acquisition device as described in claim 15, wherein the difference extracting means executes processing wherein the extracted difference nodes are subjected to a further extraction process in which a predetermined number thereof are again extracted in the order starting from the extracted difference node of which the weighting based on frequency is greatest, and the difference outputting means outputs the predetermined number of extracted nodes as the information relating to the difference in usage of the target words.

20. A word use difference information acquisition device as described in claim 12, wherein the difference extracting means outputs the top node among the difference nodes as the information relating to the difference in usage of the target words.

21. A word use difference information acquisition device as described in claim 12, wherein the difference outputting means outputs, in addition to, or instead of, the top node of the difference nodes, the bottom node of the common nodes as the information relating to the difference in usage of the target words.

22. A word use difference information acquisition device as described in claim 12, wherein the target word inputting means restricts the part of speech of the target words for which the input thereof is to be received to adjective or verb.

* * * * *